United States Patent [19]

Tsuchino et al.

[11] Patent Number: 4,785,183

[45] Date of Patent: Nov. 15, 1988

[54] METHOD FOR READING RADIATION IMAGE INFORMATION

[75] Inventors: Hisanori Tsuchino; Akiko Kano; Kuniaki Nakano; Koji Amitani; Fumio Shimada, all of Hino, Japan

[73] Assignee: Konishiroku Photo Industry Co., Ltd., Tokyo, Japan

[21] Appl. No.: 907,658

[22] Filed: Sep. 15, 1986

[30] Foreign Application Priority Data

Sep. 18, 1985 [JP] Japan .................................. 60-207599
Mar. 24, 1986 [JP] Japan .................................. 61-65351

[51] Int. Cl.$^4$ ............................................. G01N 23/04
[52] U.S. Cl. ................................. 250/327.2; 250/484.1
[58] Field of Search ........................... 250/327.2, 484.1

[56] References Cited

U.S. PATENT DOCUMENTS

| 3,859,527 | 1/1975 | Luckey | 250/327.2 |
|---|---|---|---|
| 4,236,078 | 11/1980 | Kotera et al. | 250/327.2 |
| 4,239,968 | 12/1980 | Kotera et al. | 250/327.2 |
| 4,261,854 | 4/1981 | Kotera et al. | 250/327.2 |
| 4,507,379 | 3/1985 | Tsuchino et al. | 250/327.2 |
| 4,539,138 | 9/1985 | Miyahara et al. | 252/301.4 H |
| 4,571,493 | 2/1986 | Horikawa | 250/327.2 |
| 4,582,989 | 4/1986 | Agano | 250/327.2 |
| 4,636,641 | 1/1987 | Mori et al. | 250/327.2 |

FOREIGN PATENT DOCUMENTS

| 31219 | 3/1979 | Japan . | |
|---|---|---|---|
| 55-12144 | 1/1980 | Japan . | |
| 12142 | 1/1980 | Japan . | |
| 12143 | 1/1980 | Japan . | |
| 12145 | 1/1980 | Japan . | |
| 84389 | 6/1980 | Japan . | |
| 160078 | 12/1980 | Japan . | |
| 59-38278 | 2/1984 | Japan . | |
| 232337 | 12/1984 | Japan . | |
| 86539 | 5/1985 | Japan | 250/484.1 |

Primary Examiner—Carolyn E. Fields
Attorney, Agent, or Firm—Frishauf, Holtz, Goodman & Woodward

[57] ABSTRACT

A radiation image information reading method includes scanning a stimulating ray on a radiation image converting panel surface to obtain radiation image information stored on the radiation image converting panel, the scanning step including performing scanning of the stimulating ray while repeating successively irradiation and stopping thereof. In this manner, the noise caused by fluorescent afterflow, stimulation afterglow, stray light from outside of the apparatus or a laser beam, etc., can be removed simply and correctly. A visible image which is correct with good reproducibility corresponding to the real image, and also good in sharpness, can be obtained, whereby diagnosis with high reliability by means of a radiation image is rendered possible. In one embodiment, only image signals detected during periods of irradiation by the stimulating ray are read. In another embodiment, the difference in image signals read during irradiation and during stopping of the stimulating ray is used as the image information.

7 Claims, 10 Drawing Sheets

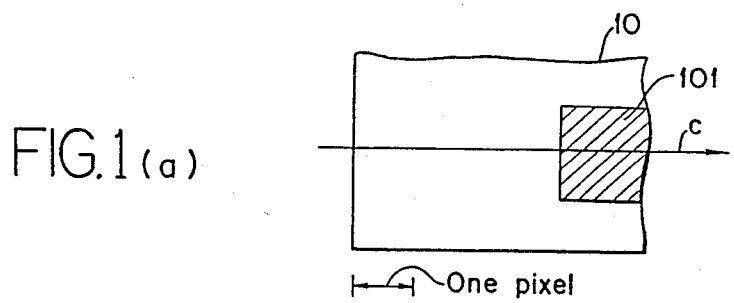
FIG.1(a)
FIG.1(b)
FIG.1(c)
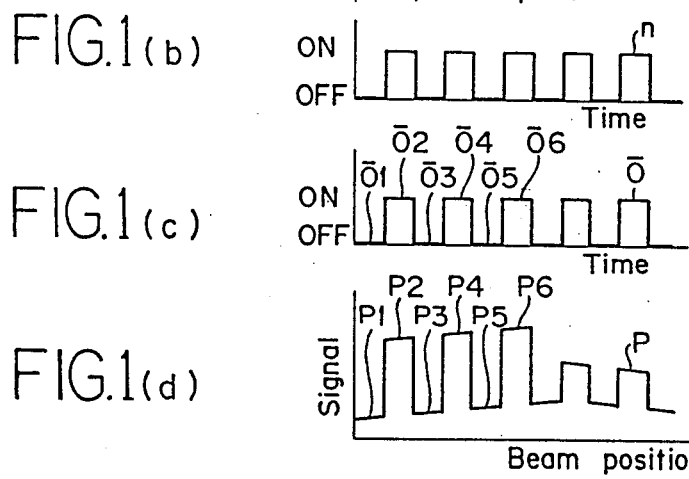
FIG.1(d)
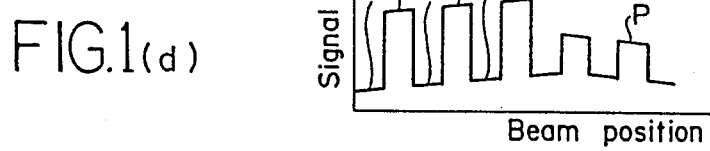
FIG.1(e)
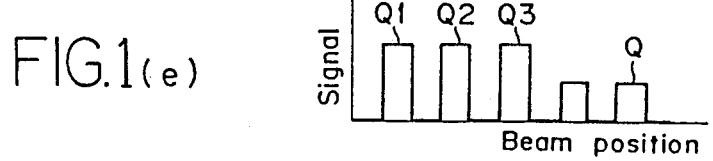
FIG.1(f)
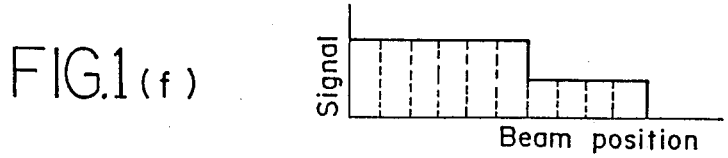

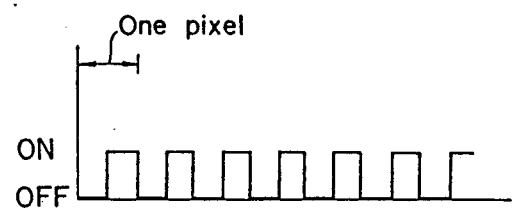
FIG. 2 (a)
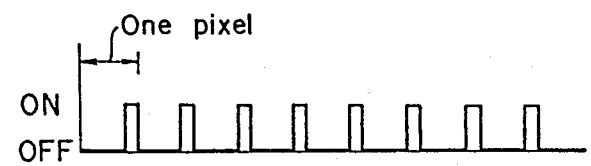
FIG. 2 (b)
FIG. 3
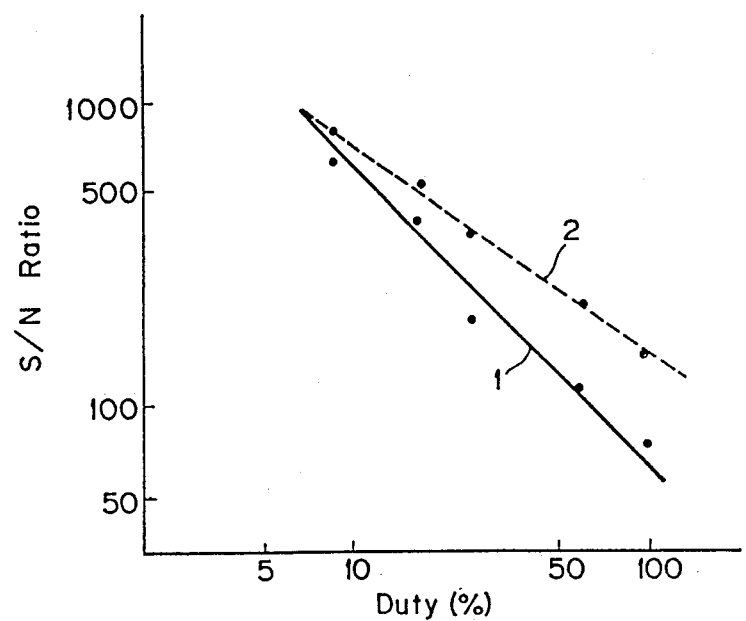

FIG. 4
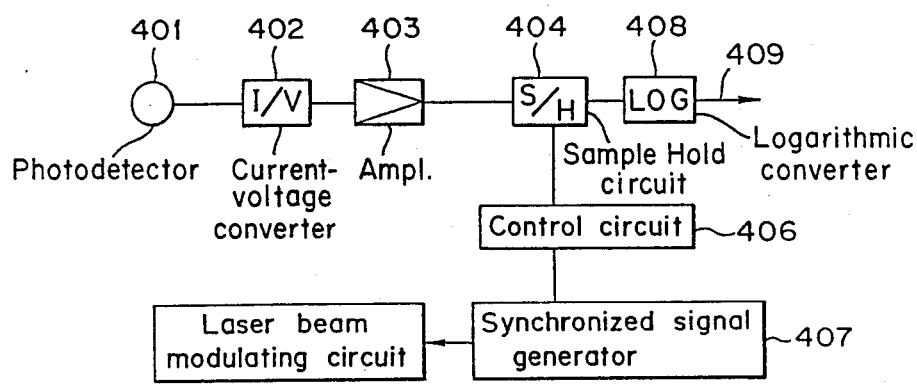
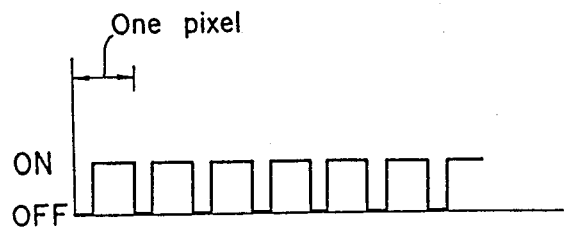
FIG. 5(a)
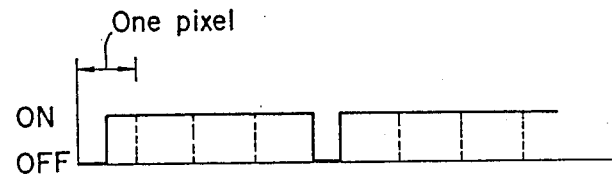
FIG. 5(b)

METHOD FOR READING RADIATION IMAGE INFORMATION

BACKGROUND OF THE INVENTION

This invention relates to a method for reading radiation image information stored on a radiation image converting panel, more particularly to a reading method which reproduces correctly said radiation image.

When a stimulable phosphor is irradiated, the radiation energy is stored in said phosphor and the stored energy, when excited with a visible light, etc., emits fluorescence at an intensity corresponding to the stored energy, as is well known in the art.

By utilizing the above characteristic, there has been proposed a method, in which a radiation image information such as human body, etc, is stored as the latent image on a radiation image converting panel having a stimulable phosphor layer (hereinafter abbreviated as converting panel), said converting panel is scanned with an exciting light such as a laser beam, etc., to effect stimulated emission, and said stimulated emission is photoelectrically converted to an image signal, which is then visualized, as disclosed in U.S. Pat. No. 3,859,527 and Japanese Unexamined Patent Publication No. 12144/1980.

In the following, a radiation image information reading apparatus using such a converting panel as mentioned above is described by referring to FIG. 8.

A laser beam 805 for stimulation emitted from a laser beam source 801 is reflected against a galvanometer mirror 804 while being vibrated at a certain amplitude (in the X direction) to irradiate the converting panel 10 having radiation image information stored there on as the latent image.

During this operation, the converting panel 10 is moved at the same time in the Y direction perpendicular to the X direction.

Thus, the converting panel 10 is subjected to main scanning in the amplitude direction (X direction) and to subscanning in the Y direction, whereby the whole region of the converting panel 10 is scanned to effect stimulated emission on the scanning line.

On the other hand, a condensing member 806 (light collecting member) having a light-receiving surface 806a arranged in parallel to the scanning line in the vicinity thereof is provided, said condensing member 806 being gradually narrowed from the light-receiving surface 806a which forms a slender flat section until becoming substantially cylindrical at its terminal end, i.e. the transmitting surface 806b where it is adjacent to a photodetector (e.g. photomultiplier tube, etc.) 807 with a filter 808 for separation of stimulated emission from the laser beam for stimulation sandwiched therebetween.

The stimulated emission which has occured on the scanning line with the arrangement as described above enters through the light receiving surface 806a into the condensing member 806 to reach the transmitting surface 806b, then enters into a photodetector 807 where it is photoelectrically converted and sent to an image display apparatus 811, and the image information converted is processed and observed as a visible image by use of a CRT or a magnetic tape or a light sensitive photographic material.

It should be noted here that, at the light-receiving surface 806a of the condensing member 806, the light from the points within the total reflection angle relative to the light-receiving surface 806a all enters the condensing member 806. Thus, not only the stimulated emission stimulated by the laser beam 805 on the scanning line, but also stray light from outside of the apparatus or a part of the reflected light of the laser beam from the surface of the converting panel 10 or afterglow, etc., are all picked up to be mixed with the stimulated emission displaying the image information to become the noise light which disturbs the correct image information.

Of the above noise lights, the stray light from outside of the apparatus and the reflected light of the laser beam from the surface of the converting panel 10 can be excluded by means of light shielding, filter, etc., and therefore the afterglow from the converting panel 10 becomes the problem as the noise light.

The above mentioned afterglow includes afterglow of fluorescence generated by excitation of the stimulable phosphor of the converting panel with a radiation (hereinafter called fluorescent afterglow) and afterglow of excited emission generated by exciting the energy stored in the stimulable phosphor by a stimulating ray such as laser beam, etc. (hereinafter called stimulation afterglow).

The above mentioned fluorescent afterglow generally exhibits an exponentially functional attenuation curve as shown in FIG. 9. That is, if a radiation is irradiated for $\Delta t$ time from the time t1 to t2 and stopped at t2, the emission intensity LO will not be immediately attenuated to 0. The situation of attenuation differs depending on the phosphor, and the time constant before the emission intensity becomes 1/e may be $10^{-6}$ second for a tungstic acid salt, while it may be as long as $10^{-3}$ to $10^{-1}$ second for a phosphor containing rare earth element ions or manganese ions. Also, the fluorescent afterglow will frequently have minor afterglow as represented by the curve b in FIG. 9 overlapped in addition to the major afterglow as represented by the curve a in the same Figure. The aforesaid minor afterglow has generally weak emission intensity, but its time constant for attenuation is markedly great.

While stimulated emission is emitted from a very small area (corresponding to a picture element or pixel) on which a stimulating ray is irradiated at a certain time, fluorescent afterglow is emitted from the whole surface on which a radiation has been irradiated and the light from all the points within the total reflection angle relative to the light-receiving surface 806a of the condensing member 806 in FIG. 8 is all condensed.

In this case, since the condensing area of the condensing member 806 is remarkably greater as compared with the stimulated emission area of the converting panel, even if the fluorescent afterglow intensity per one picture element (one pixel) may become negligibly small as compared with the stimulated emission intensity, the fluorescent afterglow quantity is not negligible as the dose to be transmitted to the photodetector.

For example, if the condensing area of the condensing member is 400 mm $\times$ 2 mm and the size of one picture element is 200 $\mu$m $\times$ 200 $\mu$m, the number of picture elements condensed in the condensing member is $2 \times 10^4$, and therefore even if the fluorescent afterglow intensity per one picture element may be about $10^{-4}$ of the stimulated emission intensity, the ratio of the fluorescent afterglow quantity and the stimulated emission quantity of the doses to be transmitted to the photodetector becomes 2 : 1.

Thus, in the radiation image information reading method of the prior art, it is necessary to wait until the fluorescent afterglow intensity becomes sufficiently negligible after irradiation of radiation, whereby it has been difficult to read the image information rapidly and continuously in a large amount. Particularly, this drawback was vital when the time constant of the major afterglow represented by the curve a in FIG. 9 is great or when there exists a minor afterglow with a great time constant represented by the curve b in the same Figure, even though the time constant of the major afterglow may be small.

On the other hand, the above mentioned stimulation afterglow is due to delay in turn-down after stopping of stimulation with a laser beam, and it has an exponentially functional attenuation curve similar to the above fluorescent afterglow as shown in FIG. 10. This attenuation curve differs depending on the stimulable phosphor, but in either case, for example, if excitation is effected from the time t4 to t5 and stopped at t5, attenuation will abruptly occur from the emission intensity SO, but soon after the attenuation rate is dropped to form an exponentially functional curve. The stimulation afterglow has frequently a minor afterglow as represented by the curve d in FIG. 10 overlapped in addition to major afterglow as represented by the curve c in the same Figure similarly as in the case of fluorescent afterglow. The minor afterglow has generally a weak emission intensity, but its attenuation time constant is markedly high.

The stimulation afterglow appears for the first time by irradiation of a stimulating ray, with the progress of scanning by stimulating ray, the stimulation afterglow intensities of the respective picture elements have varied depending on the time from irradiation of the exciting light, and therefore the stimulation afterglow quantity to be transmitted to the photodetector at a certain time is the sum of afterglow quantities in picture elements existing within the condensing area of the condensing member. For this reason, the stimulation afterglow is negligible when the time constant of attenuation of the stimulation afterglow is sufficiently small relative to the scanning time per picture element of the stimulating ray.

Thus, in the radiation image information reading method of the prior art, in the case when the time constant of the major stimulation afterglow represented by the curve c in FIG. 10 is great or in the case when there exists a minor stimulation afterglow with a great time constant represented by the curve d in the same Figure, even though the time constant of the major stimulation afterglow may be small, great stimulation afterglow is added to the stimulated emission which became the noise component of the radiation image, whereby it was difficult to read correctly the radiation image information.

Further, by referring to an example of a converting panel by use of a thallium-activated rubidium bromide phosphor (RbBr Tl) as the stimulable phosphor, this situation is described in detail based on FIGS. 12(a)-(c).

FIG. 12(a) shows a converting panel 10 on which a radiation has been uniformly irradiated. In the Figure, b represents the scanning line of an exciting light (laser beam). H in the same FIG. (b) is a modulation signal of the laser beam and the laser output modulated by said modulation signal and only one line on the converting panel 10 is irradiated with laser. I in the same FIG. (c) is a signal obtained by photoelectric conversion of stimulated emission and stimulation afterglow generated from the converting panel 10 by a photodetector, and J is a signal corresponding to the stimulation afterglow quantity by stimulation of the stimulable phosphor with the stimulating ray. Since the time constant of the stimulation afterglow of RbBr : Tl (time constant : several msec), the stimulation afterglow level is gradually elevated with the progress of stimulating ray scanning and is gradually decreased as shown by the curve K after completion of stimulation. For this reason, as is also apparent from this Figure, the ratio of the true image signal I-J to the signal J corresponding to the stimulation afterglow quantity (SN ratio) is deteriorated with the progress of scanning from b' to b", whereby only about 70 (37 dB) can be obtained at b" of the converting panel 10.

Under the state of the art as described above, methods for improving the drawbacks as described above have been proposed. For example, Japanese Unexamined Patent Publication No. 232337/1984 discloses a method in which an image signal is obtained, which is corrected by detracting the signal corresponding to the afterglow quantity obtained when there is no stimulating ray on the converting panel from the image signal obtained when the stimulating ray is scanning over the converting panel.

However, according to this method, since the term in which the signal corresponding to the afterglow quantity can be detected is limited to the time when the above stimulating ray is not on the converting panel of the reciprocal major scanning period of the stimulating ray, only one detection is possible for scanning of one line at the maximum, whereby no precise correction with respect to the afterglow quantity can be expected.

For, the noise light quantity by the above fluorescent afterglow incident on the light-receiving surface 806a of the condensing member 806 in FIG. 8 as described above will be fluctuated from the fore end to the rear end of subscanning depending on the increase of the surface of the converting panel 10 within the total reflection angle relative to the light-receiving surface 806a and appearance or disappearance of the region with different fluorescent afterglow intensities. Also, the stimulation afterglow incident on the light-receiving surface 806a of the condensing member 806 as described above will be fluctuated as a matter of course with fluctuation in stimulation emission intensity. This is because the noise light quantity mixed during scanning reading will be fluctuated from time to time during the progress of subscanning and main scanning.

This situation is described in detail by referring to FIG. 11. FIG. 11(a) shows recording of, for example, an object to be taken 1101 having a uniform thickness, and FIG. 11(b) shows the relationship between the image signal obtained when the converting panel 10 is scanned with an stimulating ray along the scanning line b and the beam position of the stimulating ray. In FIG. 11(b), the image signal practically obtained by scanning is shown by m1. On the other hand, the signal corresponding to the afterglow quantity is a function of the image pattern recorded on the converting panel 10 and the time (beam position of the stimulating ray) as described above, and changes with time as shown by m3. The corrected (true) image signal m2 is obtained by detracting the signal m3 corresponding to the afterglow quantity from the above image signal m1 at the respective positions.

However, if here the signal corresponding to the afterglow quantity is detected at the position b1 or b3 of the above scanning line b and this is regarded as the signal corresponding to the afterglow quantity in the region b2 of the above scanning line b (corresponding to m5), the corrected image signal obtained by detracting m5 which has been regarded as the signal corresponding to the afterglow quantity from the image signal m1 at the respective positions becomes like m4, which is different from the true image signal m2.

As described above, the fluorescent afterglow quantity and the stimulation afterglow quantity are functions of the image pattern recorded on the converting panel and time, and therefore, it is evident that no precise correction can be made by detecting a signal corresponding to the afterglow quantity only once at the maximum per one line of scanning in spite of their changes from time to time in one line of scanning and correcting the image signal by use of this signal.

SUMMARY OF THE INVENTION

The present invention has been accomplished in view of the drawbacks of the radiation image information reading method of the prior art as described above, and an object of the present invention is to provide a radiation image information reading method capable of obtaining a correct reproduced image by reducing the stimulation afterglow quantity thereby to obtain a correct image signal corresponding to the real image.

In order to accomplish the above object, the present invention proposes to provide a radiation image information reading method by scanning a stimulating ray over a radiation image converting panel surface to obtain the radiation image information stored on said radiation image converting panel, wherein said stimulating ray is scanned while repeating successively irradiation and stopping thereof and the stimulation afterglow quantity which is mixed during scanning reading of the radiation image converting panel and fluctuates from time to time during the progress of subscanning and main scanning is reduced to at least a practically permissible range by repeating successively irradiation and stopping of the stimulating ray, whereby a correct radiation image information is obtained.

According to a preferred embodiment of the present invention, the radiation image information reading method of the present invention is characterized in that the above stimulating ray is scanned while repeating successively irradiation and stopping thereof and the difference in image signals read during irradiation and during stopping of said stimulating ray is used as the image information. In other words, the preferred embodiment of the present invention obtains a correct radiation image information by applying correction within at least a practically permissible range by repeating successively irradiation and stopping of an exciting light for the noise light quantity which is mixed during scanning reading of the radiation image converting panel and fluctuates from time to time during progress of subscanning and main scanning

BRIEF DESCRIPTION OF THE DRAWINGS

FIG. 1(a) illustrates the irradiated line of a stimulating ray on a converting panel, FIG. 1(b) illustrates a modulated signal of a laser beam, FIG. 1(c) illustrates the laser output modulated by said modulated signal, and FIG. 1(d) illustrates the relationship between the stimulated emission emitted from the converting panel and afterglow;

FIG. 2(a), (b) are illustrations for explanation of the proportions of irradiation and stopping of the stimulating ray;

FIG. 3 is a graph showing reduction of the stimulation afterglow when duty is varied;

FIG. 4 is an analog circuit for determining the image signal;

FIG. 1(e), (f) and FIG. 5 are illustrations for explanation of the procedure of the present invention for carrying out successively noise light correction by irradiating intermittently the stimulating ray for scanning;

DESCRIPTION OF THE PREFERRED EMBODIMENTS

The method of the present invention is described in more detail by referring to FIGS. 1(a)-1(f).

FIG. 1(a) shows recording of an object to be taken 101 having a uniform thickness as an image on a converting panel 10. C is the scanning line of a stimulating ray (laser beam). In FIG. 1(b), n is the modulation signal of a laser beam which modulates the laser beam at the rate of once per 1 picture element (pixel). In FIG. 1(c), $\overline{O}$ indicates the laser output modulated with the modulation signal n and P in FIG. 1(d) is the signal obtained by photoelectric conversion of the stimulated emission and afterglow emitted from the converting panel 10 at the photodetector (photomultiplier tube, etc.). In FIG. 1(d) P1, P3, P5, . . . are signals when the laser beam is stopped (corresponding to the above laser outputs $\overline{O}1$, $\overline{O}3$, $\overline{O}5$, . . . ), which are signals corresponding to the afterglow quantities P2, P4, P6, . . . are image signals when laser beam is irradiated (corresponding to the above laser outputs $\overline{O}2$, $\overline{O}4$, $\overline{O}6$, . . . ), which are signals in which signals corresponding to afterglow quantities are added to the true image signals.

Figure 12:
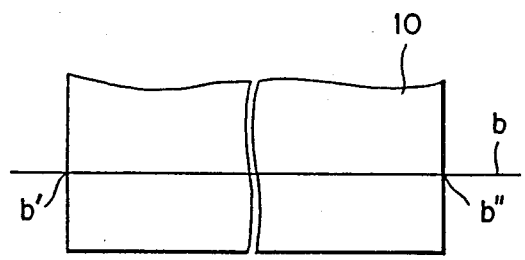
FIGS. 12(a)-(c) illustrate the relationship between the intensity of stimulated emission which occurs by irradition image and the intensity of the noise light and the light practically read.
Figure 12:
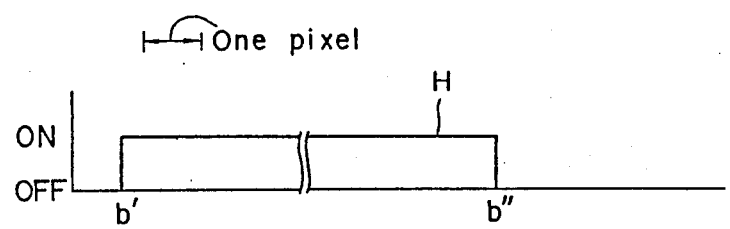
Figure 12:
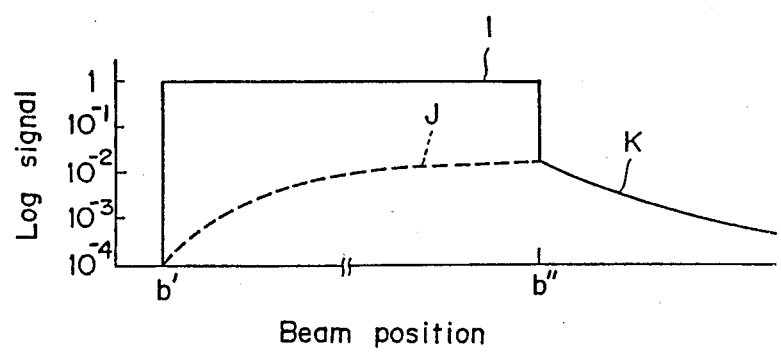

In FIG. 1(d), of the afterglow quantities, the stimulation afterglow quantity is lowered during the stopping period of the stimulating ray, and therefore the stimulation afterglow quantity level during the irradiation period is consequently lowered remarkably as compared with the case when the stimulating ray is continuously irradiated. For this reason, when the method of the present invention is applied for a converting panel using RbBr:Tl as the stimulable phosphor shown in FIG. 12, if the rate of modulation of laser light is made at irradiation : stopping = 1 : 9, for example, the ratio of the true image signals to the signal corresponding to the stimulation afterglow quantity (SN ratio) is improved to about 700 (57 dB) at the portion corresponding to b" of the converting panel 10 in FIG. 12.

The ratio of irradiation time of the laser beam to stopping time in one picture element is not required to be 1 : 1 as the practically permissible range as shown in FIG. 2(a), but the stopping time is preferably longer as shown in FIG.(b).

FIG. 3 shows how the SN ratio can be improved when the ratio of irradiation time of the laser beam to scanning time per one picture element of the same laser beam (duty) is variously changed in the method of the present invention. In this Figure, 1 shows an example of a converting panel using the above thallium-activated rubidium bromide phosphor (RbBr Tl), and 2 shows an example of a converting panel using the europium-activated barium fluoride bromide (BaFBr : Fu). As is apparent from this Figure, when the stopping time is shorter relative to the scanning time per one picture element, the effect of improvement of SN ratio becomes smaller, and therefore it is preferred that the irradiation time should be 80% or less of the scanning time per one picture element. Also, the percentage of the stopping time should be as much as possible within the range capable of reading the signals. However, it is preferred that the stopping time should be set so that the irradiation time of the laser beam may not become shorter than the correspondence time to the laser beam of the stimulable phosphor.

The stimulable phosphor employed in the present invention as the converting panel refers to a phosphor exhibiting stimulated emission corresponding to the dose of the first light or high energy radiation by optical, thermal, mechanical or electrical stimulation (stimulation) after irradiation of the first light or high energy radiation, and practically a phosphor exhibiting stimulated emission by a stimulating ray of 500 nm or longer is preferred. Particularly, a phosphor having a large responding speed of the stimulated emission to a stimulating ray is preferred, and a phosphor exhibiting the stimulated emission effectively to a light within the wavelength region oscillated by a semiconductor laser is more preferred. As the abovementioned stimulable phosphor, there may be mentioned, for example, phosphors represented by SrS:Ce,Sm, SrS:Eu,Sm, La$_2$O$_2$S:Eu,Sm and (Zn, Cd)S:Mn,X (wherein X is a halogen) as disclosed in U.S. Pat. No. 3,859,527. Also, ZnS:Cu,Pb phosphors as disclosed in Japanese Unexamined Patent Publication No. 12142/1980; barium aluminate phosphors represented by the formula BaO·xAl$_2$O$_3$: Eu (wherein $0.8 \leq X \leq 10$) and alkaline earth metallosilicate type phosphors represented by the formula M$^{II}$O·xSiO$_2$:A (wherein M$^{II}$ is Mg, Ca, Sr, Zn, Cd or Ba; A is at least one of Ce, Tb, Eu, Tm, Pb, Tl, Bi and Mn; and x is $0.5 \leq X \leq 2.5$) may be employed.

Additional examples of phosphors may include, as disclosed in Japanese Unexamined Patent Publication No. 12143/1980, alkaline earth fluorinated halide phosphors represented by the following formula:

$(Ba_{1-x-y}Mg_xCa_y)FX:eEu^{2+}$ (wherein X is at least one of Br, Cl and I; each of x, y and e is a number satisfying the conditions of $0 \leq x+y \leq 0.6$; $xy \neq 0$ and $10^{-6} \leq e \leq 5 \times 10^{-2}$); phosphors as disclosed in Japanese Unexamined Patent Publication No. 12144/1980 which corresponds to U.S. Pat. No. 4,236,078:

LnOX:xA (wherein Ln represents at least one of La, Y, Gd and Lu; X represents Cl and/or Br; A represents Ce and/or Tb; and x represents a number satisfying $0 < x < 0.1$); those as disclosed in Japanese Unexamined Patent Publication No. 12145/1980:

$(Ba_{1-x}M^{II}_x)FX:yA$ (wherein M$^{II}$ represents at least one of Mg, Ca, Sr, Zn and Cd; X represents at least one of Cl, Br and I; A represents at least one of Eu, Tb, Ce, Tm, Dy, Pr, Ho, Nd, Yb and Er; x and y represent numbers satisfying the conditions of $0 \leq x \leq 0.6$ and $0 \leq y \leq 0.2$); those as disclosed in Japanese Unexamined Patent Publication No. 84389/1980:

BaFX:xCe,yA (wherein X is at least one of Cl, Br and I; A is at least one of In, Tl, Gd, Sm and Zr; x and y are each $0 < x \leq 2 \times 10^{-1}$ and $0 < y \leq 5 \times 10^{-2}$); rare earth element activated divalent metal fluoride phosphors as disclosed in Japanese Unexamined Patent Publication No. 160078/1980:

M$^{II}$FX,xA:yLn (wherein M$^{II}$ is at least one of Mg, Ca, Ba, Sn, Zn and Cd; A is at least one of BeO, MgO, CaO, SrO, BaO, ZnO, Al$_2$O$_3$, Y$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$ and ThO$_2$; Ln is at least one of Eu, Tb, Ce, Tm, Dy, Pr, Ho, Nd, Yb, Er, Sm and Gd; X is at least one of Cl, Br and I; x and y are each number satisfying the conditions of $5 \times 10^{-5} \leq x \leq 0.5$ and $0 < y \leq 0.2$; those as disclosed in Japanese Unexamined Patent Application No. 148285/1982: (corresponding to Japanese Published Application No. 3827 and to U.S. Pat. No. 4,507,379)

xM$_3$(PO$_4$)$_2$·NX$_2$:yA

M$_3$(PO$_4$)$_2$:yA (wherein each of M and N represents at least one of Mg, Ca, Sr, Ba, Zn and Cd; X represents at least one of F, Cl, Br and I; A represents at least one of Eu, Tb, Ce, Tm, Dy, Pr, Ho, Nd, Yb, Er, Sb, Tl, Mn and Sn; x and y are integers satisfying the conditions of $0 < x \leq 6$ and $0 \leq y \leq 1$);

nReX$_3$·mAX'$_2$:xEu nReX$_3$·mAX'$_2$:xEu,ySm (wherein Re represents at least one of La, Gd, Y and Lu; A represents at least one of alkaline earth metals Ba, Sr and Ca; X and X' each represent at least one of F, Cl and Br; and x and y are integers satisfying the conditions of $1 \times 10^{-4} < x < 3 \times 10^{-1}$ and $1 \times 10^{-4} < y < 1 \times 10^{-1}$; and n/m satisfies the condition of $1 \times 10^{-3} < n/m < 7 = 10^{-1}$) and M$^I$X·aM$^{II}$X'$_2$·bM$^{III}$X''$_3$:cA (wherein $M^I$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X" are each at least one halogen selected from F, Cl, Br and I; A is at least one metal selected from Eu, Tb, Ce, Tm, Dy, Pr, Ho, Nd, Yb, Er, Gd, Lu, Sm, Y, Tl, Na, Ag, Cu and Mg; a is a numeral within the range of $0 \leq a \leq 0.5$, b is a numeral within the range of $0 \leq b < 0.5$ and c is a numeral within the range of $0 < c \leq 0.2$) (alkali halide phosphors). Particularly, of the above stimulable phoshors, alkaline earth fluoride type phosphors and alkali halide type phosphors are preferable, because they are large in the responding speed of the stimulated emission to the exciting light and good in matching with the wavelength region oscillated by the semiconductor laser.

However, the stimulable phosphor to be used in the converting panel of the present invention is not limited to those as described above, but any phosphor which can exhibit stimulated emission when irradiated with a stimulating ray after irradiation of radiation may be useful.

FIG. 4 shows an example of an analog circuit for determining image signals.

In this Figure, the signal photoelectrically converted by a photodetector 401 is converted to a voltage at a current-voltage converter 402, then amplified by an amplifier 403 and inputted into a sample hold circuit 404. The output from the sample hold circuit 404 is outputted after logarithmic conversion by a logarithmic converter 408.

The synchronized signal generating device 407 is a means for synchronizing the timing of modulation (irradiation) of the laser beam which is a stimulating ray with that of sample holding by the sample holding circuit 404.

The control circuit 406 and the above sample hold circuit 404 detect the output signal from the amplifier 403 synchronously during irradiation of the laser beam by the synchronized signal from the synchronized signal generating device 407 to maintain the signal during stopping of the laser beam so as to interpolate it.

Of the image signals obtained by irradiating the laser beam on the converting panel, the signal corresponding to the afterglow quantity is reduced by modulation of the laser beam, and therefore the image signal 409 taken out through the logarithmic converter 408 becomes a correct one corresponding to the real image.

The above sample hold circuit 404 is a means for interpolating the image signal during stopping of the laser beam, and it is not necessarily provided. Also, said sample hold circuit 404 may be located either before or after the logarithmic converter 408, but it is more preferable to be located before the logarithmic converter 408 in view of the frequency characteristic thereof.

Next, as the preferred embodiment of the present invention, description is made about the method in which the above stimulating ray of the present invention is scanned while repeating successively irradiation and stopping and the difference in image signals read during irradiation and stopping of said stimulating ray is used as the image information.

In FIG. 1(e), Q1, Q2, Q3, ... are image signals corrected by detracting the signals corresponding to afterglow quantities (P1, P3, P5, ...) from the image signals (P2, P4, P6, ...), respectively, and they are approximate to the true image signals.

R in FIG. 1(f) represents a signal having the signal of the portion when the laser beam is stopped interpolated on the base of the corrected true image signals (Q1, Q2, Q3, ...).

Processing of the above FIG. 1(e) may be practiced for analog signals as such or after conversion to digital signals. In the case of digital signals, no real time processing is required, but they can be once stored into a memory etc., to be processed later at any desired time. Also, processing of the signals of FIG. 1(f) may be practiced for analog signals as such or after conversion to digital signals. In the case of digital signals, no real time processing is required, but they can be once stored into a memory, etc., to be processed afterwards at any desired time.

Also, the ratio of the time for laser irradiation to stopping time in one picture element is not required to be 1 : 1 as shown in FIG. 1(c) as a practical permissible range as shown in FIG. 5(a), but either one may be shorter, with the time for stopping being preferably shorter. Practically, the time for laser irradiation is 10% or more of the scanning time for every picture element. Further, as shown in FIG. 5(b), the signal corresponding to the afterglow quantity is not required to be determined per one picture element, but it can be determined twice or more per one main scanning, and the optimal number of determinations may vary depending on the afterglow quantity, rapidness of attenuation and scanning speed of the laser beam, etc.

According to the present invention, the fluorescent afterglow quantity and stimulation afterglow quantity varying from time to time as described above can be constantly correctly detected to remove the signals corresponding to said afterglow quantity from the image signals, and therefore correct signals corresponding to real images can be obtained.

Also, according to the present invention, since interference between image signals caused by the above stimulation afterglow can be removed by correcting image signals per one picture element, sharpness of the image can be improved.

Figure 6A:
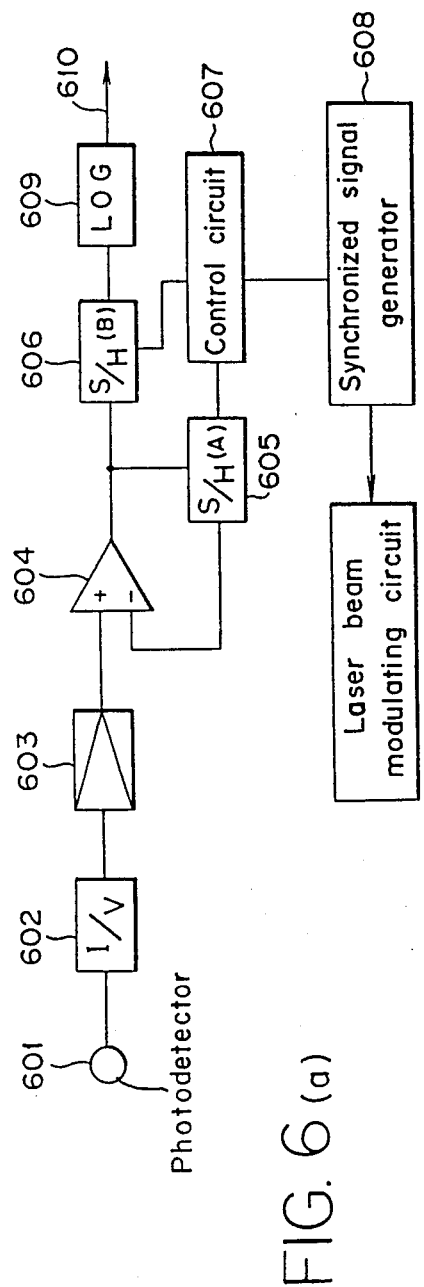
FIG. 6 (a)-(c) are block diagrams showing a circuit examples of the present invention.

Next, FIG. 6(a), (b) and (c) show example of analog circuits for reducing the signals corresponding to afterglow quantity from image signals.

FIG. 6(a), the signal photoelectrically converted by the photodetector 601 is converted to a voltage by the current-voltage converter 602, then amplified by the amplifier 603 and inputted into the (+) side of the differential amplifier 604. At the output side of the differential amplifier, the sample hold circuits (A)605, (B)606 are located, and on the (−) side of the differential amplifier 604, signals from the sample hold circuit (A)605 are inputted. Also, the output from the sample hold circuit (B)606 is outputted after logarithmic conversion by the logarithmic converter 609.

The synchronized signal generator 608 is a means for synchronizing the timing of modulation of laser beam (irradiation and stopping) with that of sample holding by sample hold circuits (A), (B).

The control circuit 607 and the sample hold circuit (A)605 act synchronously during stopping of the laser beam by the synchronized signal from the synchronized signal generator 608 to determine the voltage inputted into the (−) side of the differential amplifier 604 so that the output signal from the differential amplifier 604 may become zero and maintains that voltage until the next time of stopping of the laser beam. Also, the control circuit 607 and the sample hold circuit (B)606 act synchronously during irradiation of the laser beam by the synchronized signal from the synchronized signal generator 608 to detect the output signal from the differential amplifier 604 and maintains that signal so as to interpolate the signal during stopping of the laser beam.

Of the image signals obtained by thus irradiating the laser beam on the converting panel, the signals corresponding to afterglow quantity are reduced as the voltage inputted on the (−) side of the differential amplifier 604 from the sample hold circuit (A)605, and therefore the image signal 610 taken out through the logarithmic converter 609 becomes correct corresponding to the real image.

The sample hold circuit (B)606 is a means for interpolating the image signal during stopping of the laser beam and it is not necessarily provided. Also, the above sample hold circuit (B) may be located either before or after the logarithmic converter 609, but it is preferable to be located before the logarithmic converter 609 in view of the frequency characteristic thereof.

Figure 6B:
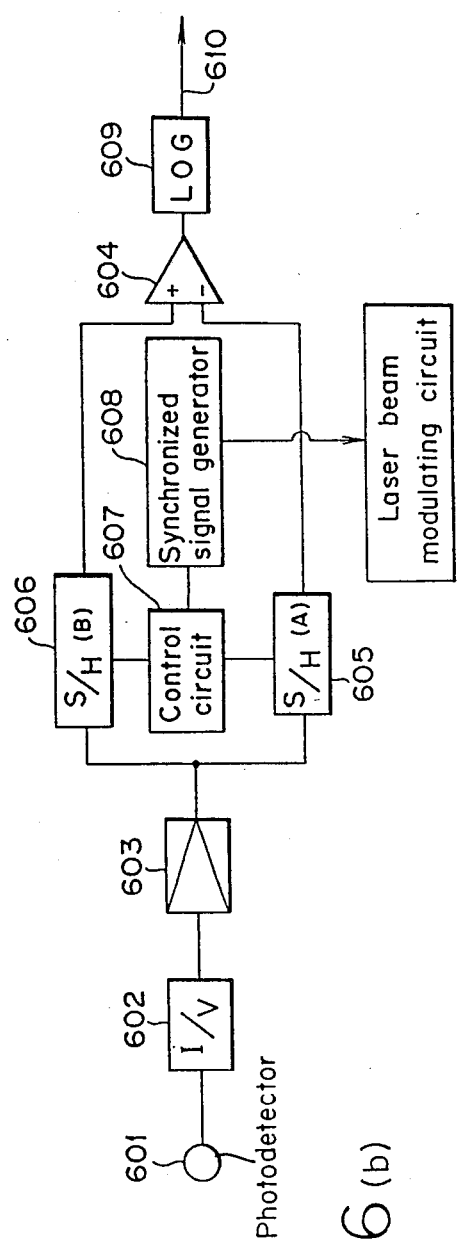

In FIG. 6(b), the signal photoelectrically converted by the photodetector 601 is converted to voltage by the current-voltage converter 602 and thereafter amplified by the amplifier 603.

The output signal from the amplifier 603 is inputted through the sample hold circuits (A)605, (B)606 into the (−) side and (+) side of the differential amplifier 604, respectively. Also, the output from the differential amplifier 604 is outputted after logarithmic conversion by the logarithmic converter 609.

The synchronized signal generator 608 is a means for synchronizing the timing of modulation of laser beam with that of sample holding by sample hold circuits.

The control circuit 607 and the sample hold circuit (A)605 act synchronously during stopping of the laser beam by the synchronized signal from the synchronized signal generator 608 to detect the signal corresponding to afterglow quantity, and maintains it until the next time stopping of laser beam. Also, the control circuit 607 and the sample hold circuit (B)606 act synchronously during irradiation of laser beam by the synchronized signal from the synchronized signal generator to detect the image signal containing the signal corresponding to afterglow quantity, and maintain it so as to interpolate the signal during stopping of the laser beam.

The sample hold circuit (B)606 is a means for interpolating the image signal during stopping of the laser beam, and it is not required to be positioned as shown in FIG. 6(b), but it may be located after the differential amplifier 604 or after the logarithmic converter 609. It is not necessarily provided.

Thus, of the image signals obtained by irradiation of the laser beam on the converting panel, the signal corresponding to afterglow quantity is maintained by the sample hold circuit (A)605 and reduced by inputting on the (−) side of the differential amplifier 604, and therefore the image signal 610 taken out through the logarithmic converter 609 becomes correct corresponding to the real image.

Figure 6C:
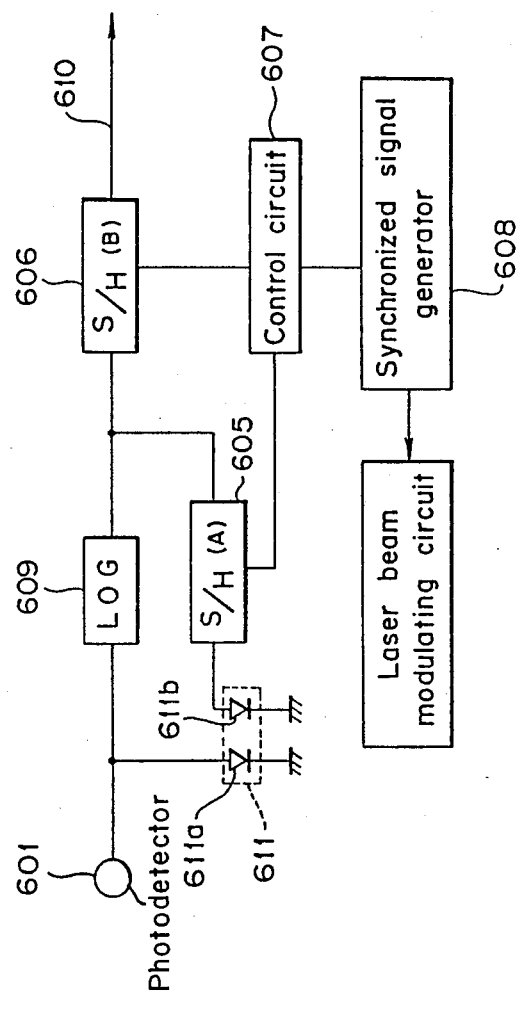

In FIG. 6(c), the signal photoelectrically converted by the photodetector 601 is connected to the logarithmic converter 609 and the photodiode side 611a of the photocoupler 611.

When a signal is inputted into the light emitting diode side 611b of the above photocoupler 611, the light emitting diode emits light and the current signal from the photodetector 601 flows partially to the photodiode side corresponding to the dose, with the remainder being inputted to the logarithmic converter 609. The output from the logarithmic converter 609 is inputted to the light emitting diode side of the photocoupler 611 through the sample hold circuit (A)605 and at the same time outputted as the image signal through the sample hold circuit (B)606. The control circuit 607 and the sample hold circuit (A)605 act synchronously during stopping of laser beam by the synchronized signal from the synchronized signal generator 608 to detect the signal corresponding to the afterglow quantity to determine the voltage to be inputted to the light emitting diode side of the photocoupler 611 so that the output signal from the logarithmic converter 609 may become zero and maintains that voltage until the next time of stopping of the laser beam. Also, the control circuit and the sample hold circuit (B) act synchronously during irradiation of the laser by the synchronized signal from the synchronized signal generator 608 to detect the output signal from the logarithmic converter 609, and maintains it so as to interpolate the signal during stopping of the laser beam. The sample hold circuit (B)606 is a means for interpolating the image signal during stopping of the laser beam, and it is not required to be positioned as shown in FIG. 6(c), and it is not necessarily required to be provided.

Of the image signals obtained by irradiating the laser beam on the converting panel, the signal corresponding to afterglow quantity is grounded by passing through the photodiode 611a of the photocoupler 611, and the image signal 610 outputted through the logarithmic converter and the sample hold circuit (B) becomes correct corresponding to the real image.

Next, an example of a radiation image information reading apparatus is shown which performs successively noise light correction by scanning intermediately the laser beam for excitation.

Figure 7A:
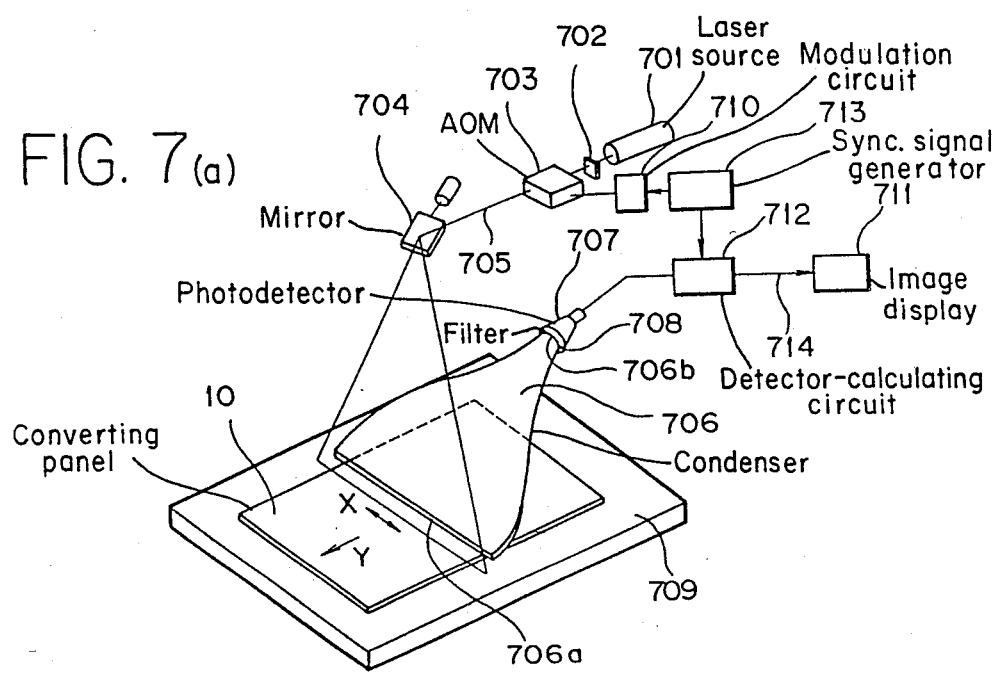
FIGS. 7(a) and 7(b) are schematic perspective views of an examples of a radiation image reading apparatus according to the present invention.
Figure 7B:
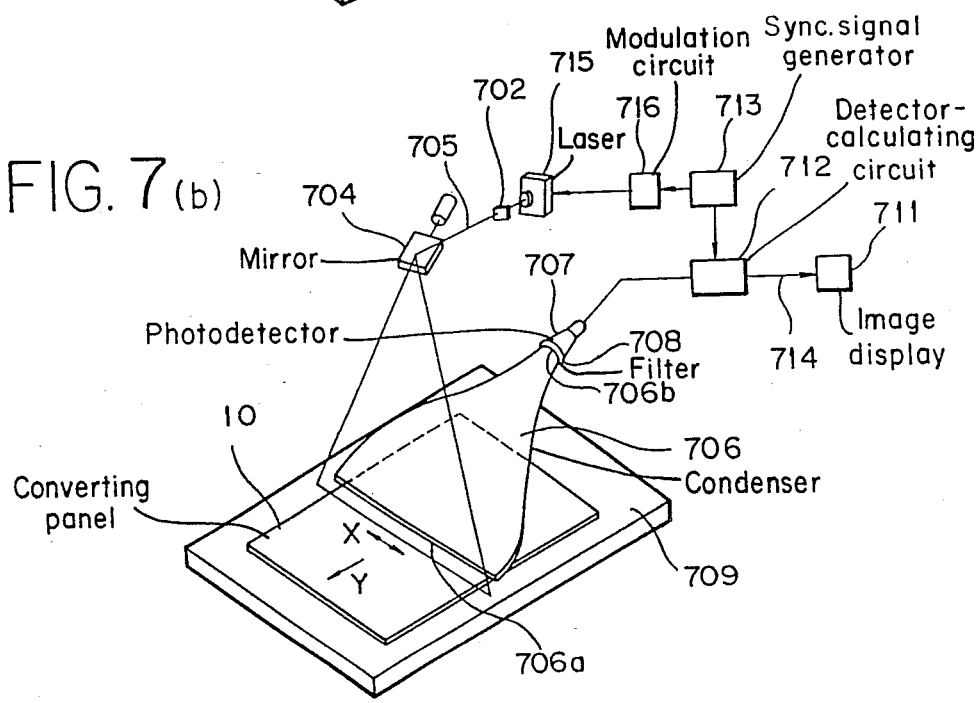
Figure 8:
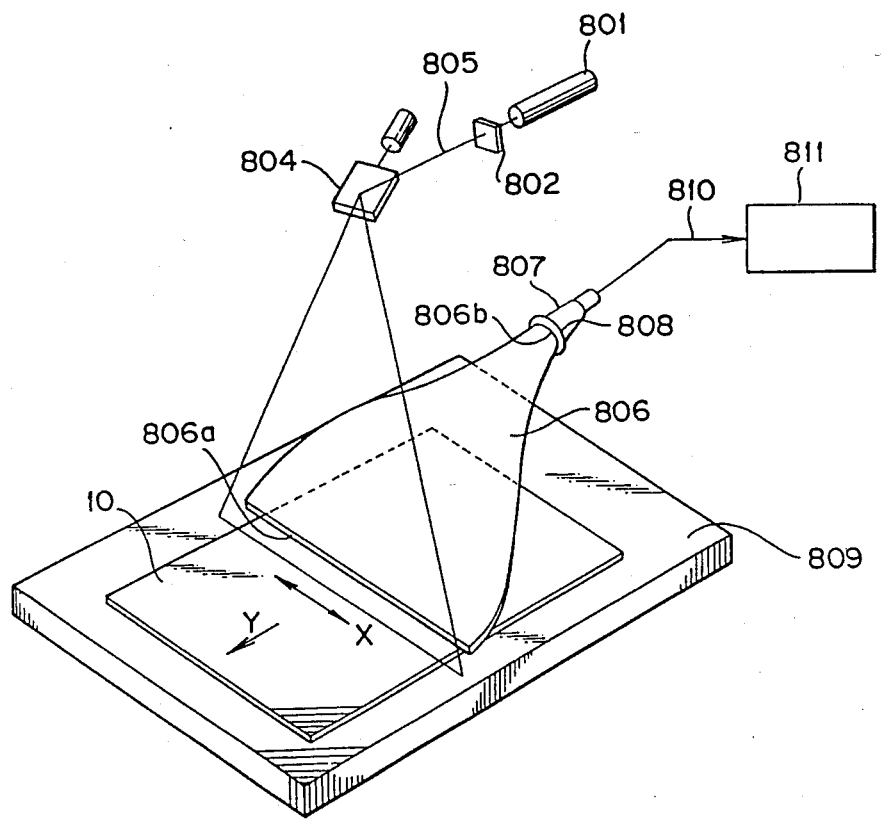
FIG. 8 is an illustration of a reading apparatus of the prior art method.
Figure 9:
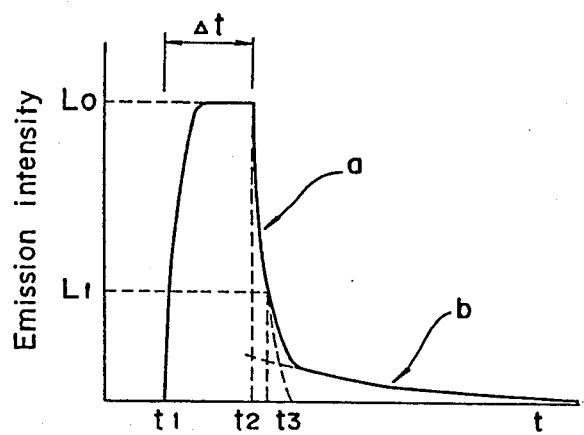
FIG. 9 is a graph showing the fluorescent afterglow by irradiation of a radiation.
Figure 10:
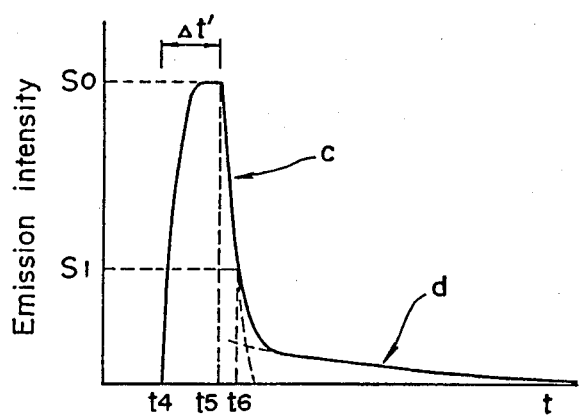
FIG. 10 is a graph showing the attenuating curve of the stimulation afterglow by the stimulating ray.
Figure 11A:
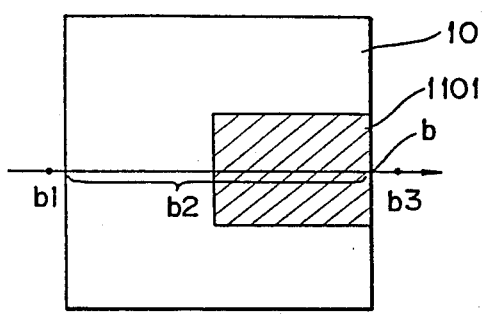
FIG. 11 is a conceptional illustration showing the relationship between the intensity of stimulated emission which occurs by radiation image and the intensity of the noise light and the light practically read.
Figure 11B:
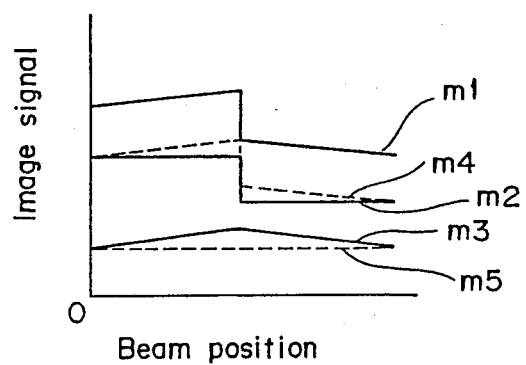

FIG. 7(a) is an example in which intermittent actuations of irradiation and stopping of the laser beam for excitation are performed by an acoustic optical modulator (represented by a symbol of AOM), and the same FIG. 7(b) is a type in which direct modulation is applied on a semiconductor laser.

However, the method of the present invention is not limited to the above-mentioned two apparatuses.

In FIG. 7(a), 701 is a laser beam source, 703 an acoustic optical modulator (AOM) for modulating the laser beam 705 from the laser beam source 701, and 710 a modulation circuit for driving AOM. In the same FIG. 6(a), the laser beam 705 is modulated at the AOM 703 by the modulating signal from the modulating circuit 710 (irradiation-stopping), and then irradiated on the converting panel 10 by reflecting in the amplitude direction (X direction) while being vibrated at a constant amplitude by, for example, a galvanometer mirror 704.

During this operation, the converting panel 10 is moved perpendicularly to the amplitude direction at the same time, whereby the whole region of said converting panel 10 is scanned to effect stimulated emission on the scanning line.

The above stimulating ray is condensed at the light receiving surface 706a of a condenser 706 to reach the transmission surface 706b and separated by a filter 708 from the laser beam, and thereafter photoelectrically converted by the photodetector 707.

712 is a signal detecting-calculating circuit including any of the circuits as shown in FIGS. 6(a)–(c) for detecting the electrical signal from the above photodetector and determining the corrected (true) image signal, and 711 is an image displaying apparatus for displaying the image signal from the signal detecting-calculating circuit 712 as a visible image.

The electrical signal from the photodetector is inputted into the signal detecting-calculating circuit 712, converted to a corrected (true) image signal by reducing the signal corresponding to afterglow quantity during stopping of the laser beam 705 from the image signal during irradiation of the laser beam 705 synchronously with modulation (irradiation-stopping) of the above laser beam 705 by the synchronized signal from the synchronized signal generator 713, and displayed as a visible image by the image displaying apparatus 711.

In FIG. 7(b), 715 is a semiconductor laser, and 716 is a modulation circuit for the semiconductor laser, which is the same as in FIG. 7(a) except for modulating directly the semiconductor laser. The semiconductor laser is convenient for miniaturization of the apparatus because it can modulate directly the laser beam. Also, the semiconductor laser can add more accurate corrections to image signals because there is no leak of laser beam during stopping of the laser beam.

As for synchronization, modulation and correction of the above exemplary device, reference may be made to the circuit example as described by use of the above FIGS. 6(a)-(c).

According to the method of this embodiment, if it is applied for the case in which fluorescent afterglow is negligible with lapse of a long time after recording of a radiation image information onto a converting panel, the signal corresponding to the afterglow quantity becomes only the stimulation afterglow.

In contrast, if it is applied for the case in which stimulation afterglow is negligible because of the slow speed of the stimulating ray scanning over the converting panel, the signal corresponding to the afterglow quantity becomes only the fluorescent afterglow.

Also, according to the method of the present invention, even if there may exist a noise light other than fluorescent afterglow and stimulation afterglow, its correction can be made simultaneously with correction of the above afterglows.

In the method of the present invention, the intensity of the stimulating ray lighting in pulses as described above may be detected and the above radiation image information may be corrected based on said detected information. By doing so, a deterioration of radiation image caused by fluctuation of the stimulating ray with time can be avoided.

Having described in the above embodiment about an example in which scanning vver a converting panel with a stimulating ray is performed reciprocally, entirely the same description is applicable for the case in which scanning is performed in only one direction by blanking (of return path).

Further, in the embodiment as described above, an example by use of a stimulable phosphor has been shown as the converting panel, but the reading method of the present invention can be also utilized in the method as shown in, for example, Japanese Unexamined Patent Publication No. 31219/1979, etc., in which a photoconductive member is used as the converting panel and this is read with an exciting light by utilizing electrostatic latent images.

By use of the present invention, the noise caused by fluorescent afterglow and stimulation afterglow can be removed simply and correctly.

Also, by use of the present invention, the noise caused by stray light from outside of the apparatus or laser beam, etc., can be removed simply and correctly.

Further, by use of the present invention, deterioration of sharpness of the image caused by stimulation afterglow can be improved.

As described above, according to the present invention, a visible image which is correct with good reproducibility corresponding to the real image and also good in sharpness can be obtained, whereby diagnosis with high reliability by radiation image is rendered possible.

We claim:

1. In a radiation image information reading method comprising scanning a stimulating ray over a radiation image converting panel surface to obtain radiation image information stored on said radiation image converting panel, said radiation image converting panel having a plurality of picture elements which contain image information, each of said picture elements including a stimulable phosphor which performs an emission when subjected to irradiation by a stimulating ray, the improvement comprising:
performing scanning of said stimulating ray over said panel while repeating successively irradiation by said stimulating ray and stopping of said stimulating ray over said panel for every picture element of said panel; and
reading the stored radiation image information from said panel by detecting an image signal only during periods of irradiation by the stimulating ray.

2. The radiation image information reading method of claim 1, wherein the irradiation time of said stimulating ray is 80% or less of the scanning time for every picture element.

3. The radiation image information reading method of claim 1, wherein the irradiation time of said stimulating ray is 10% or more of the scanning time for every picture element.

4. In a radiation image information reading method comprising scanning a stimulating ray over a radiation image converting panel surface to obtain radiation image information stored on said radiation image converting panel, said radiation image converting panel having a plurality of picture elements which contain image information, each of said picture elements including a stimulable phosphor which performs an emission when subjected to irradiation by a stimulating ray, the improvement comprising:
performing scanning of said stimulating ray over said panel while repeating successively irradiation by said stimulating ray and stopping of said stimulating ray over said panel; and
determining a difference between image signals read during periods of irradiation by said stimulating ray and periods of stopping of said stimulating ray, and generating said image information as a function of said determined difference.

5. The radiation image information reading method of claim 4, wherein the irradiation and stopping of the stimulating ray is carried out for every picture element; and the irradiation time of the stimulating ray is 80% or less of the scanning time for every picture.

6. The radiation image information reading method of claim 4, wherein the irradiation and stopping of the stimulating ray is carried out for every picture element and the irradiation time of the stimulating ray is 10% or more of the scanning time for every picture.

7. The radiation image information reading method of claim 4, wherein the irradiation and stopping of the stimulating ray is carried out for every picture element of said panel.

* * * * *